United States Patent
Swaminathan et al.

(10) Patent No.: US 9,152,865 B2
(45) Date of Patent: Oct. 6, 2015

(54) DYNAMIC ZONE STABILIZATION AND MOTION COMPENSATION IN A TRAFFIC MANAGEMENT APPARATUS AND SYSTEM

(71) Applicant: ITERIS, INC., Santa Ana, CA (US)

(72) Inventors: Dilip Swaminathan, Costa Mesa, CA (US); Shashank Shivakumar, Santa Ana, CA (US); Robert J. Hwang, Brea, CA (US); Yan Gao, Placentia, CA (US); Wing Lam, Anaheim, CA (US); Todd W. Kreter, Irvine, CA (US); Michael T. Whiting, Rancho Santa Margarita, CA (US)

(73) Assignee: ITERIS, INC., Santa Ana, CA (US)

( * ) Notice: Subject to any disclaimer, the term of this patent is extended or adjusted under 35 U.S.C. 154(b) by 364 days.

(21) Appl. No.: 13/912,547

(22) Filed: Jun. 7, 2013

(65) Prior Publication Data

US 2014/0362222 A1    Dec. 11, 2014

(51) Int. Cl.
*G06K 9/00* (2006.01)
*H04N 7/18* (2006.01)
*G08G 1/01* (2006.01)

(52) U.S. Cl.
CPC .......... *G06K 9/00785* (2013.01); *G08G 1/0145* (2013.01); *H04N 7/18* (2013.01)

(58) Field of Classification Search
CPC .......... G06K 9/00791; G06K 9/00798; G06K 9/00785; G08G 1/04; G08G 1/0145; G08G 1/0175
USPC .......................... 348/118, 149, 148; 382/104
See application file for complete search history.

(56) References Cited

U.S. PATENT DOCUMENTS

| | | | | |
|---|---|---|---|---|
| 2002/0054210 | A1* | 5/2002 | Glier et al. | 348/149 |
| 2007/0263096 | A1* | 11/2007 | Bouzar | 348/208.3 |
| 2011/0091131 | A1* | 4/2011 | Price et al. | 382/294 |

* cited by examiner

*Primary Examiner* — John Villecco
(74) *Attorney, Agent, or Firm* — Lazaris IP

(57) ABSTRACT

A traffic management apparatus and system performs data processing functions on images in a video data stream to analyze differences between portions of the images and account for movement of a camera at a traffic intersection or other such environment. The traffic management apparatus and system is configured to be placed on a span wire or other non-fixed position at or near the traffic intersection.

23 Claims, 5 Drawing Sheets

DYNAMIC ZONE STABILIZATION AND MOTION COMPENSATION IN A TRAFFIC MANAGEMENT APPARATUS AND SYSTEM

CROSS-REFERENCE TO RELATED PATENT APPLICATIONS

Not applicable.

FIELD OF THE INVENTION

The present invention relates generally to traffic management and vehicular observation and detection. More specifically, particular embodiments of the invention relate to dynamic zone stabilization and motion compensation performed on video images that enable cameras to be placed on span wires and other non-fixed locations in traffic environments.

BACKGROUND OF THE INVENTION

In the existing art, analysis of video images is commonly used as a means of detecting vehicles for providing information for actuation of traffic signals, and has been for many years. Cameras that capture these video images are typically mounted on fixed intersection infrastructure such as light standards, signal mast arms, wooden poles, etc. In video from cameras mounted in this way, a user draws detection "zones" of varying types onto an image using computing devices. These detection zones are drawn for each vehicle lane to determine the presence of vehicles, and are sometimes referred to as virtual loops as they perform a similar function to dedicated in-pavement road loops. These detection zones are also used in order to reduce the amount of the image that is required to be processed to allow existing commercially-available processing chips to be used.

While the method of mounting cameras on fixed poles works at many intersections, there is a class of intersections known as span wire for which this mounting location is problematic. Span wire intersections typically suspend wires across an intersection on which signal lights and other equipment for the motorist to see are mounted. Span wires typically comprise either single spans or a main span wire with a tether wire either above or below the wire to help stabilize equipment. The poles that these span wires are suspended from are often well away from the roadway and when video detection cameras are mounted thereon, they suffer from significant occlusion at least due to the angle to the roadway.

Cameras have been previously mounted on these types of wires spanning the intersection to obtain a better viewing angle, but when mounted in this way there is often significant camera motion which makes it difficult for video detection algorithms to accurately function. Most often, due to camera motion, vehicle detections are missed at a higher than desired rate and detections are made when no vehicles are present, known as a false call. This is because the detection zones do not move in sync with the image. Hence video detection algorithms do not work well in span wire implementations.

As a result, traffic management agencies using span-wire mounted signals have not previously been able to widely deploy video vehicle detection, as span-wire mounted cameras provided tough challenges for image processing algorithms, due to uncontrolled and random camera movement. Image stabilization systems exist in the prior art that can reduce the amount of movement in an image, and these have been applied to video streams to improve the actual image prior to entering the video detection algorithm. These systems, however, focus on the entire image, rather than implementing ways to stabilize a particular zone or area within an image instead of the image itself, and therefore are typically more expensive than desired, at least because they consume excessive computational capacity, rendering them slow and impractical in many situations.

BRIEF SUMMARY OF THE INVENTION

The present invention discloses a vehicular observation and detection apparatus and system that include methods of performing traffic management on a platform that is undergoing significant movement, such as a camera mounted on a span wire. These traffic management methods include data processing functions that attempt to stabilize zones within an image by tracking movement of a few special zones containing certain unique features to compensate for camera motion.

The present invention solves problems associated with existing and prior art systems by locating certain known features in the camera's field of view that can always be relied upon for location purposes, such as for example lane lines and a stop bar. The present invention constructs one or more registration zones relative to these known features, and uses algorithms to track selected areas and measure the movement of these selected areas to accumulate values that are then applied to zones in additional images. In this manner, the registration zones can effectively move together with the movement of the image, and the present invention constructs templates to continuously compare with incoming images to create a score that is used to adjust the location of detection zones relative to the features in the field of view of subsequent images, based on information regarding tracked movement of the registration zones.

In one aspect, the present invention is a traffic observation and detection apparatus that includes a camera, a housing, and hardware that includes processors and memory capable of executing one or more program instructions on image data generated by the camera utilized to analyze traffic in a variety of different situations and conditions. In another aspect of the present invention, one or more methods are disclosed that analyze the image data in a plurality of data processing functions to carry out dynamic zone stabilization and motion compensation as described further herein. Regardless, by applying the approaches described herein to vehicular detection, the present invention provides a level of comfort that cameras are observing traffic conditions in the appropriate place and therefore allows traffic engineers and planners to achieve a greater level of accuracy for identifying the presence of vehicles in video detection in non-fixed implementations. The present invention provides numerous benefits and advantages over prior art, conventional traffic detection systems. For example, the present invention reduces missed vehicle detections and false calls of vehicles, thereby resulting in significant improvement in detection accuracy and efficient signaling, and saves processing time over attempting to stabilize the whole image.

The present invention provides a traffic management system that may be rack or shelf mounted inside a traffic cabinet, and is NEMA and Type 170/2070/ATC traffic controller compatible. The present invention has the capability to perform well in either isolated or networked intersections, and provides stop-bar detection, advanced vehicular detection, and enhances the ability to collect traffic data. The traffic management system disclosed herein is non-intrusive to reduce installation and maintenance costs and offers a simple and flexible installation and setup. The present invention also enables full motion color video, provides detection verification, and employs a compact, lightweight, and inconspicuous camera design.

Other embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

Historically, virtual detection zones have been used to identify the presence of vehicles in traffic management systems. These virtual zones are capable of identifying many types of vehicles, including trucks, cars, vans, bicycles and buses. However, there is no existing method of accurately implementing these virtual detection zones in a traffic environment from video images taken from a camera that is constantly moving. The principles and embodiments of the present invention provide an efficient means to accurately detect vehicles when the camera is moving relative to the area being detected and to provide this information to the traffic controller for more accurate and safe operation of signals.

Figure 1A:
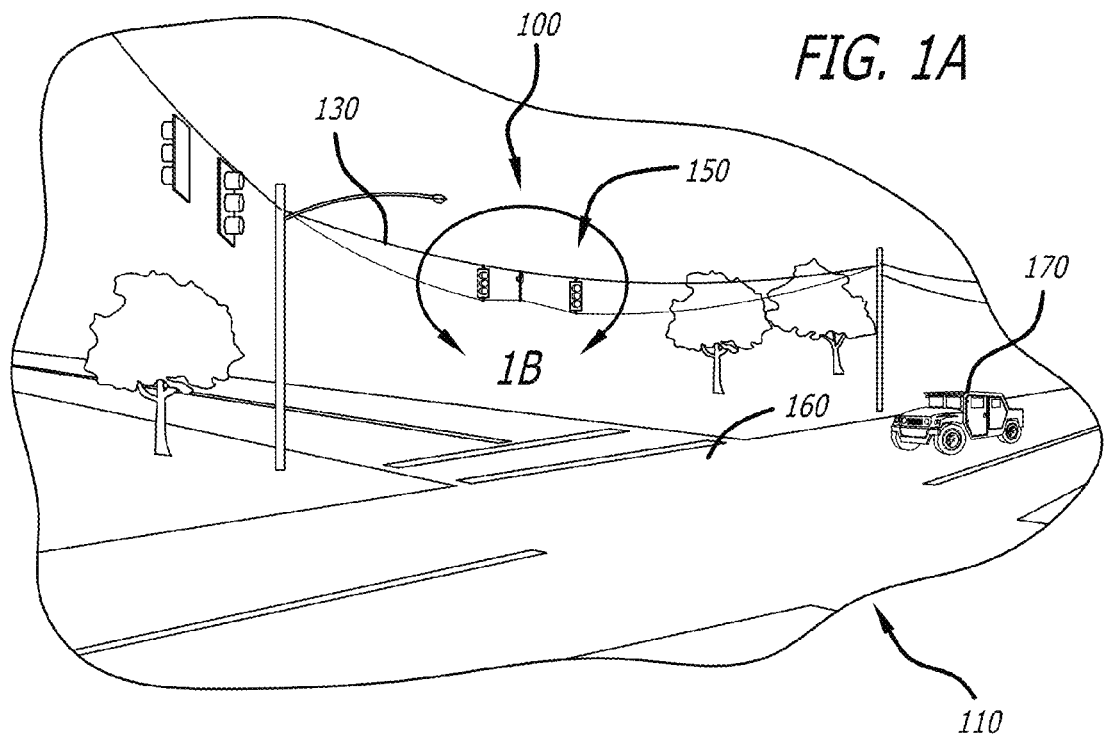
FIG. 1A is an exemplary pictorial illustration of a traffic environment with a camera positioned on a span wire.
Figure 1B:
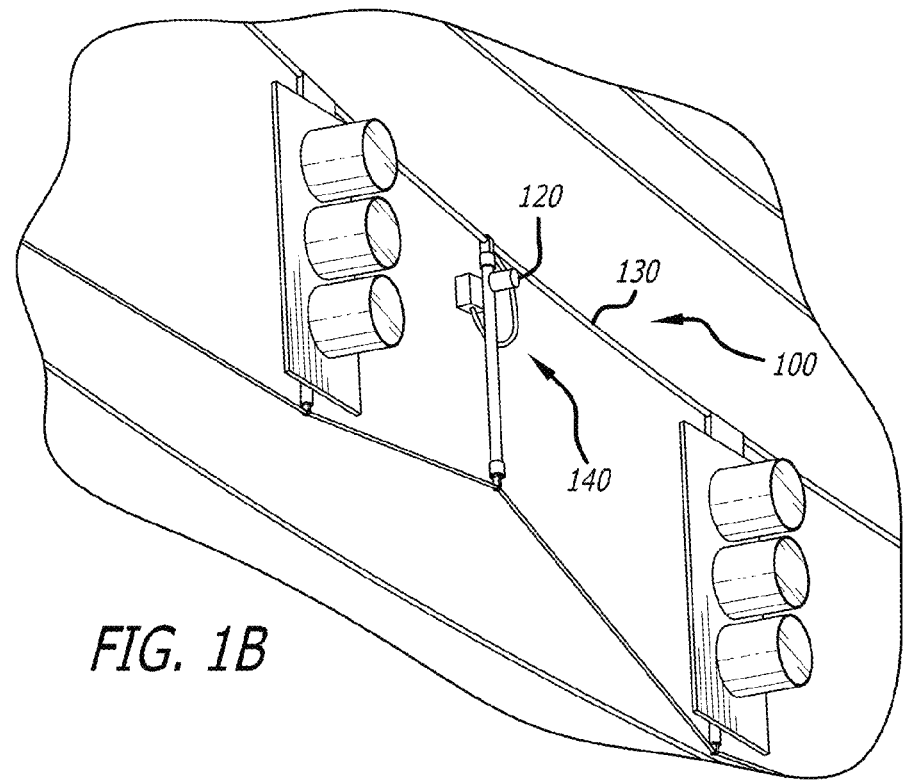
FIG. 1B is an exploded, close-up view of a span wire implementation of a camera as part of a traffic management system in a traffic environment.

The present invention is embodied in a traffic management system and apparatus 100 that applies dynamic zone stabilization and motion compensation and verification techniques to process video images in one or more data processing functions to accurately and efficiently determine the presence of vehicles 170 and bicycles 172 in a traffic environment 110, such as a traffic intersection, for vehicular observation and detection. The traffic management system and apparatus 100 provides a framework for improving traffic safety and operational efficiency of traffic signal controllers by reducing missed calls and false calls in traffic environments 110. FIG. 1A is a pictorial illustration of a traffic environment 110 with a camera 120 positioned on a span wire 130 according to one embodiment of the present invention. FIG. 1B is an exploded, close-up view of a camera 120 and traffic observation detection apparatus 140 installed in a span wire 130 implementation in a traffic environment 100. As shown in FIG. 1A and FIG. 1B, the camera 120 is a component of the traffic observation and detection system and apparatus 140 and is intended to be mounted on or near a traffic signal 150, at a position above a roadway's surface 160 in the traffic environment 110, to enable optimum angles and views for detecting vehicles 170 and bicycles 172 in one or more intended traffic areas 180 with the camera 120 and possibly other detection components, such as a radar system.

Figure 4:
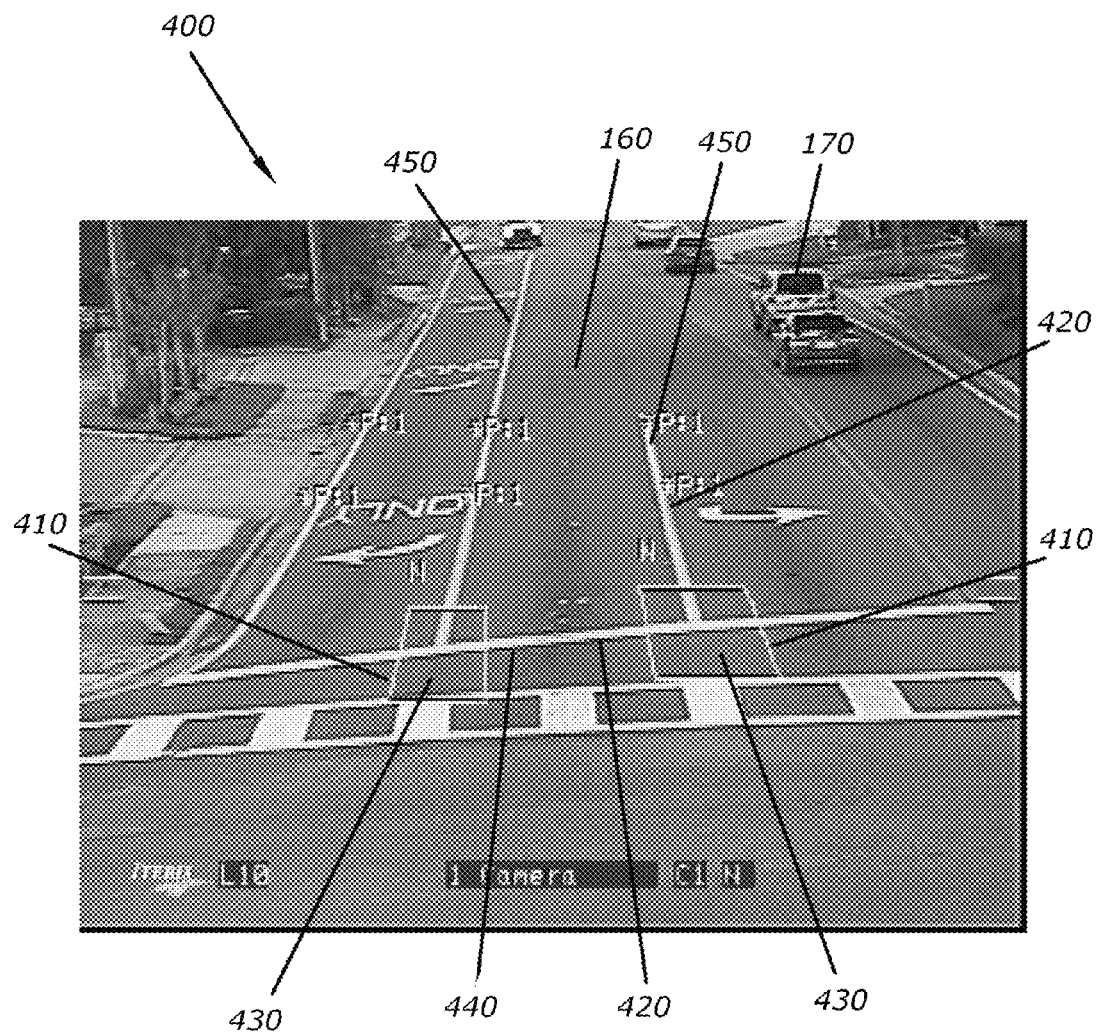
FIG. 4 is a representation of actual data from an image, showing location of registration zones for tracking of movement from image to image according to the present invention.

The present invention applies dynamic zone stabilization and motion compensation functions to data collected by the camera 120 to enable the camera 120 to be positioned on the span wire 130 as shown in FIG. 1A and FIG. 1B. In this embodiment, a plurality of detection zones are created to identity areas of a traffic environment 110 within which vehicles will be detected, and separate "registration" zones are drawn around fixed objects in images taken in the camera's field of view. These registration zones, shown for example in FIG. 4, are used to track the fixed objects from frame to frame to determine the amount of movement of the fixed objects across multiple images in a video data stream, in both the x (horizontal) and y (vertical) translational directions. These movements can be applied to subsequent vehicle detection zones to allow those zones to track from image to image across multiple images in the video data stream.

At initialization of the traffic management system and apparatus 100 of the present invention, the user sets up the field of view of the camera 120 at installation thereof and draws detection zones for each lane as the camera 120 is in motion, based on where the user contemplates such zones should be in each lane of the traffic environment 110. Typically, at least one zone is drawn for each such lane, at areas nearest a stop bar. Many zones may be drawn for each lane; the exact number of zones depends on traffic engineering preferences and the design at each traffic environment 110. Next, registration zones are manually drawn by the user. Creation of registration zones is focused by the user on places in the field of view of the camera 120 where horizontal and vertical edges of pixels come together, such as where lane lines intersect with the stop bar.

Figure 2:
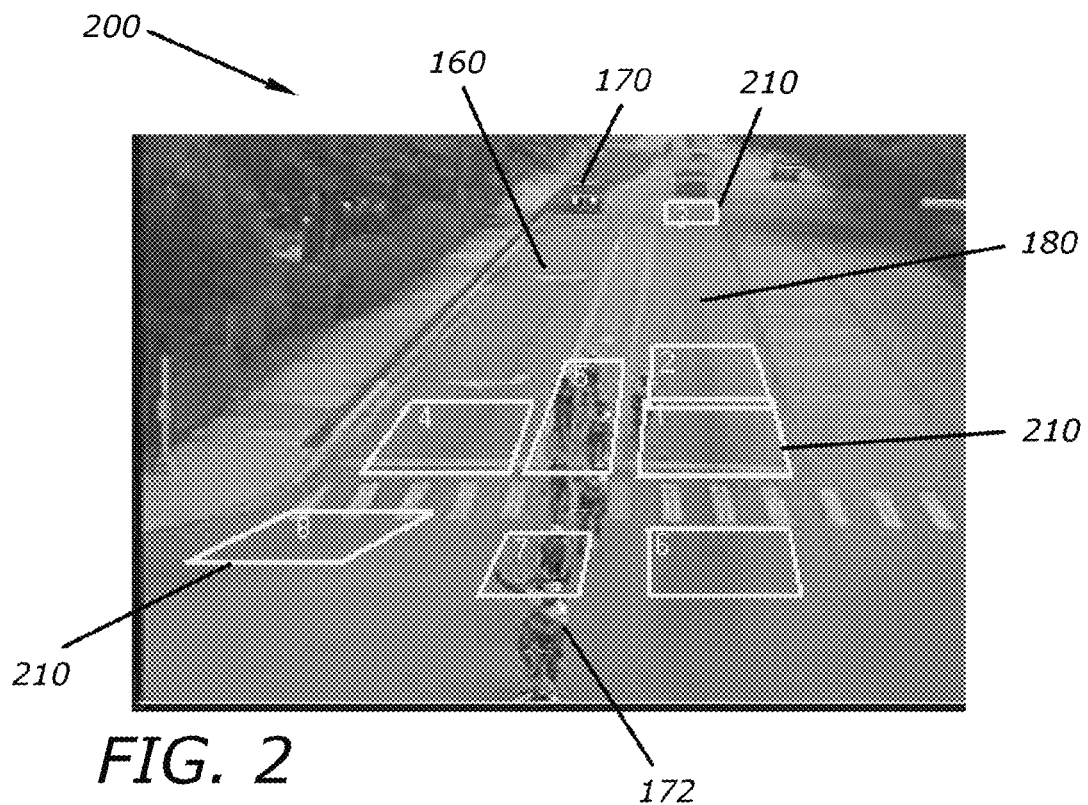
FIG. 2 is a representation of actual data from an image, over which vehicle detection zones are drawn for video processing according to the present invention.
Figure 3:
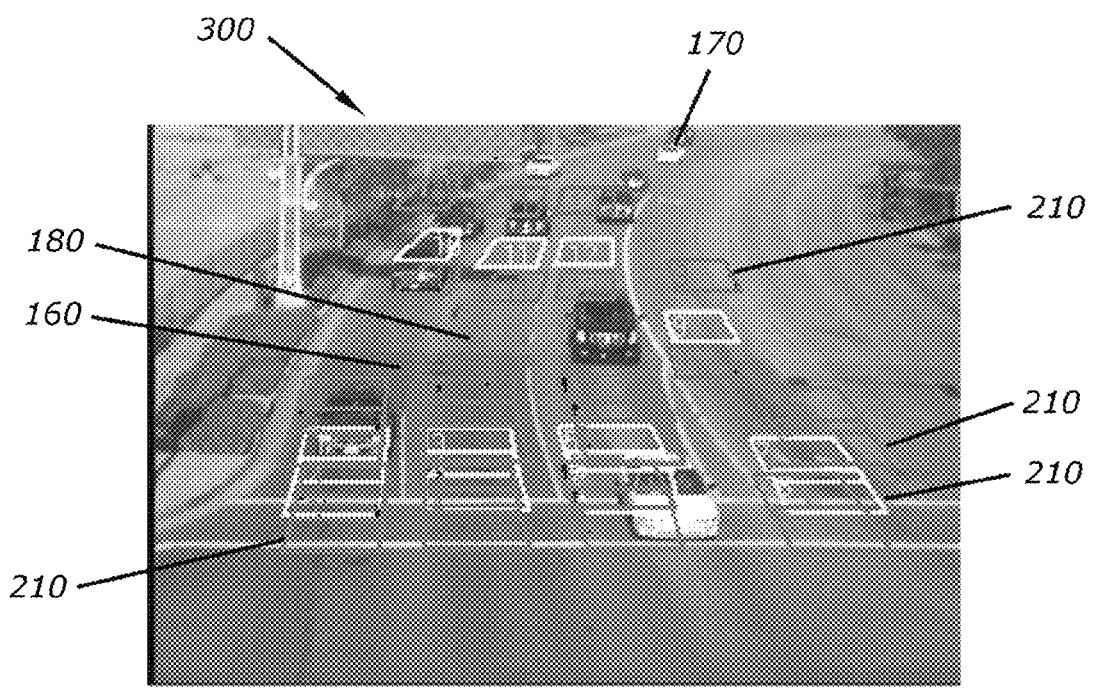
FIG. 3 is a representation of actual data from an image, showing movement of vehicle detection zones due to camera movement.

FIG. 2 and FIG. 3 are represented by actual data in images 200 and 300 captured the camera 120. FIG. 2 and FIG. 3 show detection zones 210 and an exemplary degree of movement from image to image. FIG. 2 is an illustration of vehicle detection zones 210 drawn over an image 200 for video data processing, and FIG. 3 is an illustration of movement of vehicle detection zones 210 due to camera movement. Algorithms typically search for the presence of vehicles 170 and bicycles 172 in these detection zones 210 to perform a variety of functions, notably to adjust traffic signal 150 timing. In span wire 130 implementations, however, and as can be seen from FIG. 3, camera movement has the effect of increasing an error rate and thereby increasing the chances of ineffectiveness of video image processing in ensuring proper signal 150 timing under different traffic conditions.

FIG. 4 is an image of actual data showing typical locations of registration zones 410 for tracking of movement of detection zones 210 from image to image. The present invention locates particular features 420 in a localized area 430 for at least one initial image 400 taken by the camera 120 based on detection zone configuration, which includes both detection zones and registration zones. User-drawn registration zones 410 may also include some unique features 420. The present invention attempts to establish at least a stop bar 440 and one or more lane lines 450, as well as any other markers which can be identified based on pixel brightness and contrast, particularly along vertical or horizontal edges. The present invention then develops templates based on these registration zones 410, and scans subsequent images using these templates to create a best score for computing a change in direction, $d_y$, that is then used to continuously adjust detection zones 210 to account for movement of the field of view of the camera 110. Therefore, in one aspect, the present invention can be considered as an image registration and zone stabilization method and system configured to perform dynamic zone stabilization and motion compensation 100 of the traffic observation and detection system and apparatus 140.

It is to be noted that although the present invention attempts to detect the presence of a stop bar 440 at least in the initial image, the presence of a stop bar 440 is not a prerequisite for establishing a registration zone 410. The present invention uses a stop bar 440 as a horizontal marker, but there are many instances where stop bars are not present or not visible in a traffic environment 110. Therefore, it is to be understood that although the present invention refers in many instances to the stop bar with reference to the creation of registration zones 410, drawing a registration zone 410 is not dependent on this feature, and other field of view indicators, for example markers for pedestrian crossing areas, may be utilized in lieu of and/or in addition to the stop bar.

Dynamic zone stabilization and motion compensation functions in the traffic management system and apparatus 100 of the present invention rely on user-drawn registration zones 410 to identify portions, or edges, of the particular features 420 in a localized area 430 exhibiting a high degree of contrast, most notably by pixel brightness. Lane lines 450 (vertical markers) and stop bars 440 (horizontal markers) are exemplary roadway features 420 that provide such high degrees of contrast. These offer the ability to track translational movement of the registration zones 410 in the y-direction and may be extended to track translational movement in the x-direction as well. Curvatures may also be identified among the contrasting pixels when drawing registration zones 410 to be able to track rotational movement as well as translational movement.

While it is contemplated in the embodiment above that registration zones 410 are user-created, it is further contemplated that additional embodiments of the present invention may include automatic or automated means of creating registration zones 410. For example, the present invention may be configured to identify and create optimal registration zones 410 without user input, so that some or all of the registration zones 410 are automatically generated during the initialization process. The present invention may also combine means for generating registration zones 410 by both user-provided input and automated methods of locating areas of image where registration zones 410 may be drawn.

Dynamic zone stabilization and motion compensation in the traffic management system 100 according to the present invention assumes that these particular features 420 in the localized area 430 are in a fixed position on a roadway's surface 160. Using the horizontal and vertical markers identified in the registration zones 410 relative to these particular features 420, templates are created against which comparisons between registration zones 410 are made. The present invention performs these comparisons by searching from a known previous position of these features 420 to match the movement of the features 420 from frame to frame, and this searching and matching in the comparative process is conducted pixel by pixel.

When a portion of one or more features 420 is identified as having moved from one frame to the next in a registration zone 410, the present invention attempts to identify the best possible match with a template. This is performed for each pixel, and is performed continuously to adapt pixel locations from registration zones 410 from frame to frame, as images are collected from the camera 110 continuously.

It may be the situation that the present invention is not able to confidently identify features 420 in a registration zone 410. This may occur due to factors such as casted shadows (for examples because of trees, buildings, clouds), and rain, snow etc. which causes the features 420 stored in the template to appear significantly different from what is observed in the camera image. In this case, the present invention attempts to remedy the situation by applying one or more filters or by returning to a default position for the registration zones 410 by invoking a stop bar detection function as discussed below to refresh known features 420 inside the registration zones 410 based on the location of the stop bar 440. Using this technique, the present invention is therefore able to refresh its ability to apply movement tracking to detection zones 210 from scored registration zones 410 by finding known features 420 such as horizontal markers embodied by a stop bar 440 and considering known relationships in previous registration zones 410.

Figure 5:
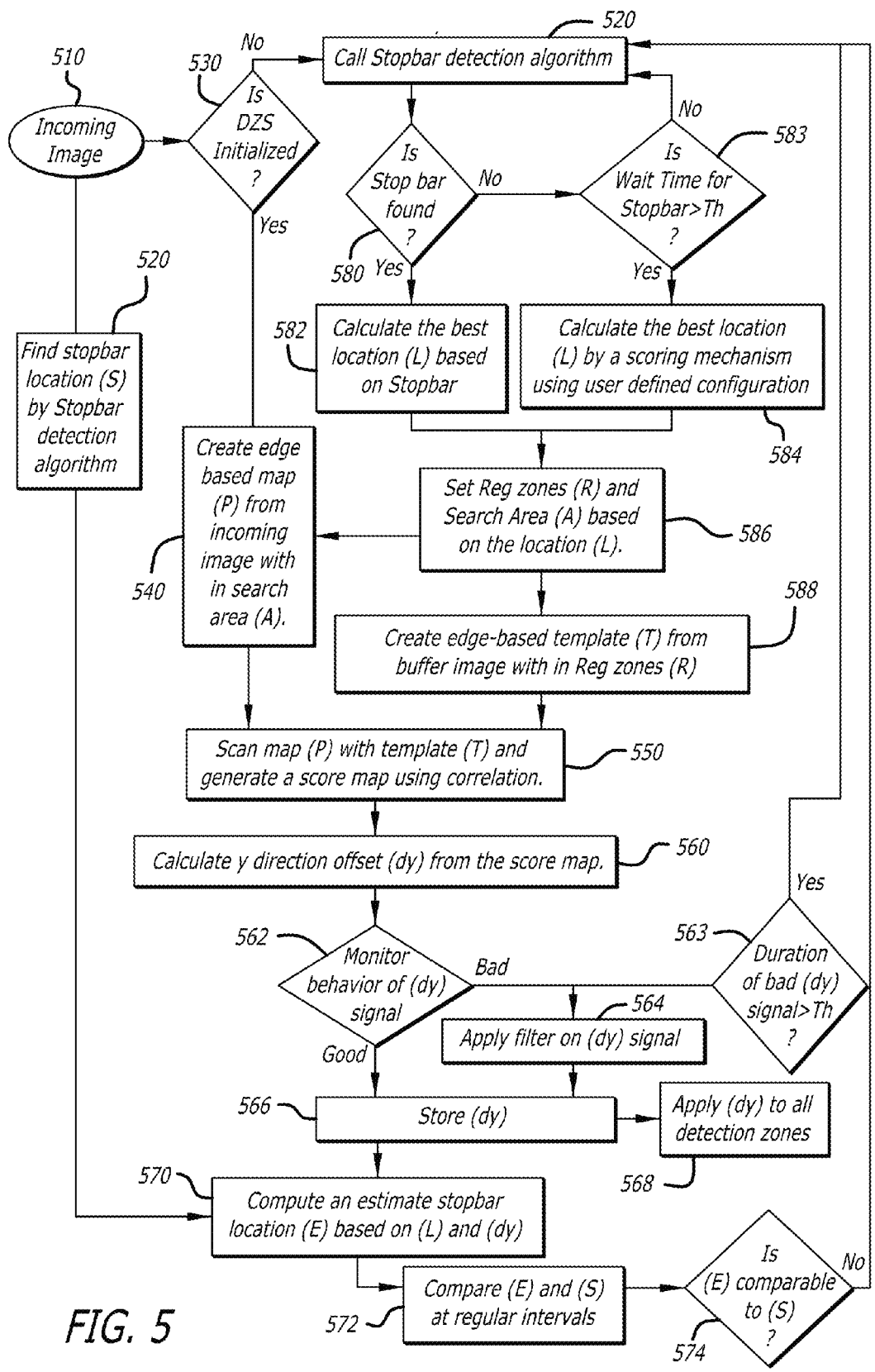
FIG. 5 is a flowchart of steps in determining registration zones and comparing detection zones to registration zones according to the present invention.

FIG. 5 is a flowchart of data processing steps applied to detection zones 210 and registration zones 410 according to the dynamic zone stabilization and motion compensation functions within the present invention. The process of performing dynamic zone stabilization and motion compensation in the traffic management system and apparatus 100 begins by ingesting an incoming image 200 in step 510 from a video camera 120 positioned on a span wire 130 at a traffic intersection or other location in a traffic environment 110. At step 520, the present invention looks for a stop bar location (S) using an independent stop bar detection process as discussed further with respect to FIG. 6. If the dynamic zone stabilization and motion compensation functions are not already initialized at step 530, the present invention calls the stop bar detection algorithm of FIG. 6. If a stop bar 440 is found at step 580, a snapshot of a registration zone 410 which includes features 420 is taken at the stop bar location, the present invention calculates the best stop bar location (L) at step 582, and the positional relationship between the stop bar and the registration zone 410 is saved for later use when the features 420 cannot be identified in a registration zone 410. If the stop bar is not found at step 583, the present invention looks at a wait time for obtaining stop bar information, and if not greater than a specified value, the present invention calls the stop bar detection algorithmic portion of FIG. 6 repeatedly until a stop bar is found. If the wait time is greater than a specified value, a scoring mechanism is used at step 584 to calculate the best location (L) representing the best possible registration zone 410 with features 420 using the user-defined configuration.

In step 586, the dynamic zone stabilization and motion compensation function sets registration zones 410 and the search area (A) and proceeds to step 588 to create edge-based templates (T) from buffer images within the registration zones 410. The process then continues as with an already-initialized function with steps 540 and 550 described below.

If dynamic zone stabilization and motion compensation of the present invention is initialized, in step 540 the present invention creates an edge-based map (P) from the incoming image 200 within a search area (A). This is performed by examining pixels in the image to define edges and generate additional features that are used to construct initial registration zones 410 and serve as the basis for subsequent template comparisons. Once the initial registration zones 410 are drawn and templates created, the present invention attempts to generate a score map using correlation on incoming subsequent images 200 in step 550 to match with the previously-drawn registration zones 410 by scanning the map (P) and templates (T). This is done to enable a compilation of a score map for all registration zones 410, so that a y-direction offset ($d_y$) can be computed in step 560. The y-direction offset ($d_y$) based on the score map for all registration zones 410 enables an understanding of recent movement of the registration zones 410 from frame to frame, and this $d_y$ is then applied in to all detection zones 210 to produce an accurate detection framework based on predictable movements in the registration zones 410. Once the present invention has computed $d_y$, it therefore has an understanding of how much the camera has moved across recent frames, and such understanding is applied to detection zones 210 to accurately capture vehicles 170 and/or bicycles 172 therein.

The y-direction offset is continually monitored in step 562, as excessive changes in this figure above tolerance amounts may indicate an incorrect value of $d_y$. The present invention attempts to remedy the situation in one of the following ways. If these excessive changes are observed only for a short period of time, it is likely to be caused by partial or complete occlusion of the registration zones 410 by vehicles to which one or more filters in step 564 are applied to correct the problem. However if this problem persists for a longer period of time (for example, a duration of a "bad" $d_y$ signal is greater than a specific value at step 563), it is assumed that the snapshot of the registration zone features 420 has become invalid due to changes in environmental conditions, thereby causing the appearance of these features in subsequent frames to be significantly different from the stored template. This situation is remedied by refreshing the stored registration zone features 420 by invoking the stop bar detection function of FIG. 6 in the most recent frame.

If there are no excessive changes as the behavior of $d_y$ is monitored in step 562, and/or if the one or more filters are applied in step 564, the present invention stores the $d_y$ value at step 566 and applies the value to all detection zones 210 at step 568. The dynamic zone stabilization and motion compensation function then computes an estimated stop bar location (E) based on the location (L) and the y-direction offset ($d_y$) at step 570. At regular time-based intervals, the present invention at step 572 compares the estimated stop bar location (E) from step 570 with the stop bar location (S) determined by the stop bar detection algorithm of FIG. 6 from step 520. It is to be noted that this comparison is a process performed independently of the dynamic zone stabilization and motion compensation function. Regardless, the comparison of step 572 acts as a system check in conjunction with the stop bar detection function of FIG. 6 to test whether dynamic zone stabilization and motion compensation is properly functioning. At step 574, if (E) is not comparable to (S), the routine proceeds to call the stop bar detection function of FIG. 6.

Figure 6:
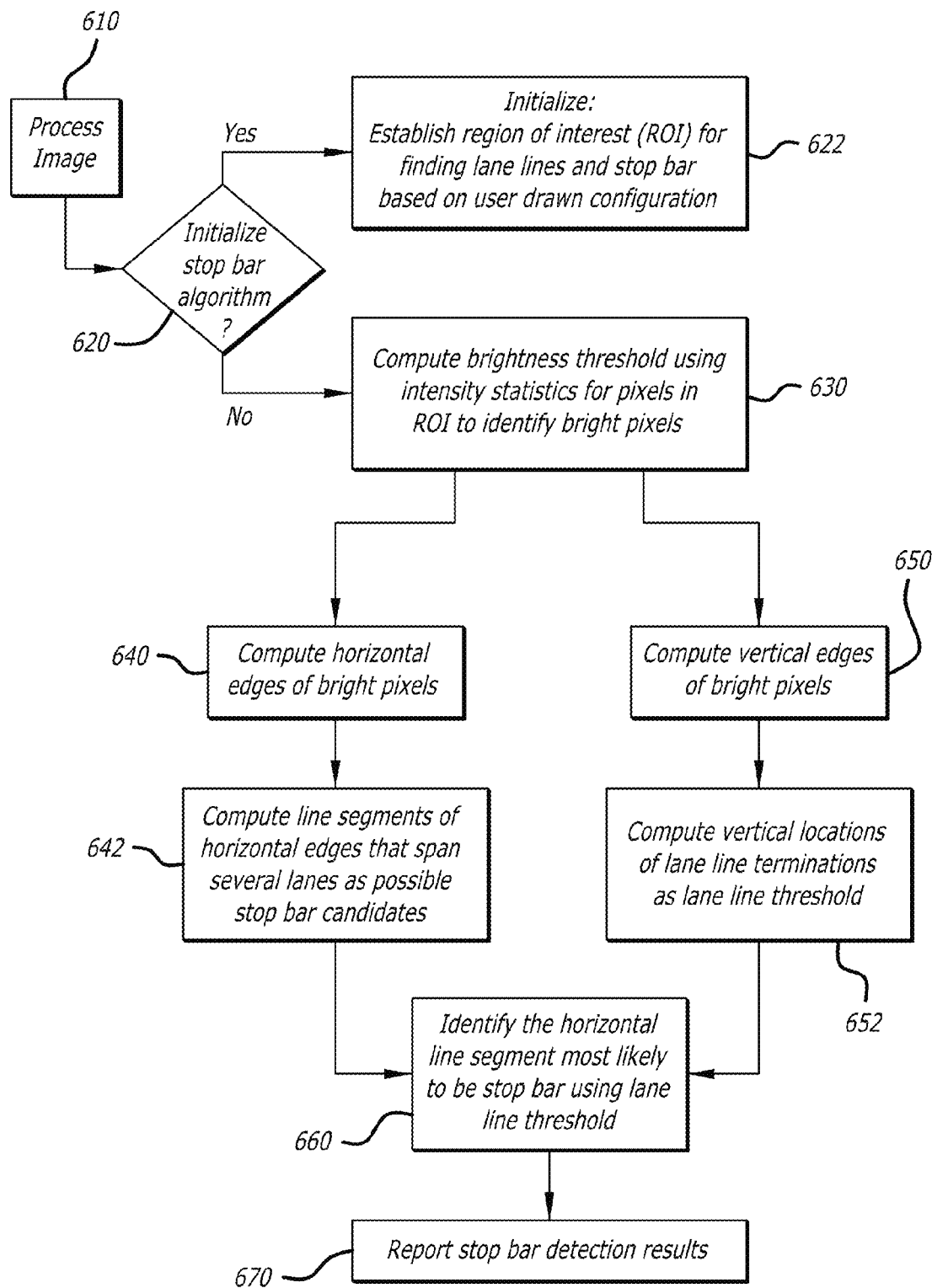
FIG. 6 is a flowchart of steps in a verification process of stop bar detection according to one aspect of the present invention.

FIG. 6, as noted above, is a flowchart of data processing steps applied in a stop bar detection portion of dynamic zone stabilization and motion compensation in the traffic management system and apparatus 100 of the present invention. As noted above with respect to FIG. 5, the data processing functions described herein are initialized by a stop bar detection portion 520 of the dynamic zone stabilization and motion compensation routine as a technique to ensure that the present invention is correctly drawing registration zones 410 based on known features 420 in the camera's field of view and also to update the stored registration zone features 420 to be able to handle changes in illumination and appearance. The incoming, initial image 200 is processed in step 610 to determine if the stop bar detection portion needs to be initialized in step 620. This is performed either on the first instance of an incoming image 200 or when a user wishes to edit an existing configuration or set up a new configuration.

The present invention processes an incoming image 400 in step 622 by establishing horizontal and vertical features 420 in the field of view based on pixel brightness and contrast, such as lane lines or markers, and their spatial relationships based on known detection zones 210. This feature data is collected and used to generate regions of interest for finding both horizontal stop bars 440 and vertical lane lines 450 in subsequent images 200. These regions of interest represent tolerable limits within which the present invention understands to expect edge candidates of brighter pixels to be present.

Stop bar detection then proceeds in step 630, in which brightness thresholds are determined by computing intensity statistics for pixels within regions of interest established for stop bar and lane line detection in a frame. This step helps to reject undesirable edges such as casted shadows on the roadway surface, and performing this step every frame ensures that the brightness thresholds adapt to changes in the time of day, changes in the weather, and other attributes which may cloud or otherwise impact the camera's ability to accurately show pixels representing such markers. The present invention computes vertical edges of bright pixels in step 640 to detect lane lines and horizontal edges of bright pixels in step 650 to detect the stop bar 440, using the brightness thresholds of step 630.

In step 642, a lane line termination threshold is computed by examining the results of step 640. Step 652 indicates that the present invention next computes line segments of horizontal edges that span several lanes and thereby computes a set of possible stop bar candidates. Next, in step 660, the horizontal line segment most likely to be the stop bar 440 is determined by using the lane line threshold computed in step 652 and the results of the stop bar detection portion are reported in step 670 to the dynamic zone stabilization and motion compensation main routine as discussed above with respect to FIG. 5.

It will be understood from the discussion above that the registration zones 410 drawn as contemplated herein represent only specific portions of the features 420 in a camera's field of view, and therefore are indicative of only a small segment of an image 200. As a result, these registration zones 410 are very small, and consume only a small portion computational capacity versus analysis of an entire image 200. By focusing on low-dimensional features from relatively small portions of the image, the present invention significantly increases processing speed and reduces cost from having to analyze larger slices of images 200 or the entire image 200 itself. This permits continual analysis of registration zones 410 and comparison of detection zones 210 thereto, resulting in a reduced error rate for detection of vehicles 170 and bicycles 172, and permits substantial improvements in real or near-time traffic signal controller adjustment.

Data processing functions in the present invention may be embodied in a plurality of instructions resident in or accessed by memory as part of a module within a system configured to carry out dynamic zone stabilization and motion compensation. It is therefore contemplated that a system implementing the present invention may include hardware and software components that are configured to perform the techniques described herein, and that these components are well within the scope of the present invention. It is further contemplated that these hardware and software components are configured to manipulate and transform input data using the data processing functions to generate output data in one or more signals that instruct the performance of one or more tasks, such as for example detecting the presence of vehicles 170 in detection zones 210 in an image 200, and adjusting a traffic signal controller based on the presence of vehicles 170 and/or bicycles 172 in the intended area of a traffic environment 110.

The present invention also includes, in a further embodiment, a menu-based graphical user interface set up system that allows users to configure dynamic zone stabilization and motion compensation within the traffic management system and apparatus 100. Such a setup system may be accessed remotely from a mobile device, or from a location proximate to the traffic observation and detection system and apparatus 140 and/or traffic signal relative to which dynamic zone stabilization and motion compensation is being implemented. Regardless, the setup system may be configured so that multiple user options are available to customize settings, such as for example detection zones 210 that are arranged with a specific focus on certain types of vehicles such as mass transit vehicles or bicycles. Similarly, users may wish to configure the system to construct registration zones 410 for lanes of specific sizes, such as bicycle lanes. Still further, users may wish to configure the system to account for lanes marking a significant curvature in the road, for a gradient in the road, or for the absence of horizontal markers such as a stop bar 440, and may further wish to customize definition of features 420 for constructing registration zones 410 based on specific user preferences. Regardless, it is to be understood that the present invention may be customizable in many ways, and a menu-driven user interface accessible from multiple devices may be used to conduct customizations of the functions described above.

The dynamic zone stabilization and motion compensation functions, and verification functions, of the traffic management system and apparatus 100 solve problems associated with missed calls and false calls that permit installation of cameras in span wire implementations, as noted above. Missed calls occur when a traffic signal controller fails to turn from, for example, red to green to permit a waiting motorist to proceed through an intersection. Missed calls are a detriment to traffic safety, as motorists often become impatient and proceed through a red light, increasing the chances of an accident. False calls occur when a traffic signal controller incorrectly changes from, for example, red to green where there are no motorists waiting for the light to turn green. This results in inefficient traffic flow and has a potential to have impact beyond the immediate traffic environment 100 where the false call occurs, for example where signals are synchronized throughout a wide area.

The traffic management system and apparatus 100 of the present invention may include a separate tracking component designed to provide users with a tool to independently gauge the performance of dynamic zone stabilization and motion compensation once detection zones 210 and registration zones 410 are drawn. This tracking component may be a leveling agent that serves as a separate indicator of stabilization performance of the present invention. In a further embodiment, the leveling agent may be utilized to assist the user in drawing detection zones 210 and registration zones 410 with a separate indication on the user interface reflective of movement of the camera 120. With such a tracking component, the traffic management system and apparatus 100 therefore attempts to sense how much movement the camera 120 is experiencing, and applies that to the field of view to aid the user in evaluating performance, setup and maintenance of detection zones 210 and registration zones 410.

In another aspect, the traffic management system and apparatus 100 may further include a fail safe mode that monitors performance and attempts to avoid the generation of random information for traffic signal controllers. For example, in a whiteout condition in which snow completely covers lanes in a traffic environment, the system would not be able to discern locations of pixels, and therefore will generate incorrect or no information for signaling purposes. In such a situation, the fail safe mode defaults to a most recent user creation of detection zones 210 and registration zones 410 apply those zones until such time as conditions permit further application to data from video images 200. Such a fail safe mode may further incorporate information from recent movement of the camera 120 and other learned attributes of the particular traffic approach to determine how best to perform traffic signaling until the camera 120 is capable of generating appropriate images 200 to which detection zones 210 and registration zones 410 can be applied.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. For example, as indicated above, the present invention may be extended to track movement of zones by calculating an offset in the x-direction ($d_x$) in addition to the offset in the y-direction $d_y$, or apply the calculated motion values to the image itself instead of applying them to the zones. It is therefore intended that the scope of the invention be limited not by this detailed description.

The invention claimed is:

1. A method of performing detection in a traffic environment, comprising:
   receiving one or more initial images generated from a camera positioned at angle relative to and proximate to a traffic environment;
   performing a plurality of data processing functions configured to stabilize a detection zone for identifying a presence of one or more vehicles in the traffic environment, the plurality of data functions including
   drawing one or more registration zones bordered by at least one fixed, known object in a first image frame of the one or more initial images representing an intended area of the traffic environment to be registered, the one or more registration zones drawn by establishing a presence of one or more vertical indicia and one or more horizontal indicia representing the at least one fixed, known object from the first image frame of the one or more initial images to create a template, the first image frame representative of a portion of an image in the one or more initial images,
   correlating additional registration zones drawn in image frames from subsequent images from the camera with the template, each image frame representative of a portion of an image in the subsequent images,
   continuously compiling a score from a comparison of the additional registration zones with the template, computing a change in at least one direction of the at least one fixed, known object across the image frames from the score; and applying the change in at least one direction to a plurality of vehicular detection zones.

2. The method of claim 1, further comprising identifying a presence of one or more vehicles in the vehicular detection zones from the one or more initial images and the subsequent images captured by the camera.

3. The method of claim 1, further comprising generating at least one instruction to modify a traffic signal controller based on the presence of the one or more vehicles in the vehicular detection zones.

4. The method of claim 1, further comprising modifying the intended area of the traffic environment to be registered so that the at least one fixed, known object in the intended area is indicative of a bicycle lane.

5. The method of claim 1, further comprising modifying the intended area of the traffic environment to be registered so that the at least one fixed, known object in the intended area is indicative of a mass transit vehicle lane.

6. The method of claim 1, further comprising computing an intensity tolerance for determining brightness thresholds in the one or more vertical and the one or more horizontal indicia.

7. The method of claim 1, further comprising computing a lane line termination threshold by analyzing vertical edges of bright pixels.

8. The method of claim 1, further comprising detecting a stop bar by computing horizontal edges of pixels.

9. A dynamic traffic zone stabilization apparatus, comprising:
a camera positioned inside a housing at a location above and proximate to an intended traffic detection area; and
a motion compensation module configured to perform a plurality of data processing functions to analyze video data generated by the camera, the plurality of data processing functions executed by one or more program instructions resident in memory that include
a zone registration function configured to draw one or more registration zones bordered by at least one fixed, known object in a first image frame of one or more initial images representing the intended traffic detection area to be registered by establishing a presence of one or more vertical indicia and one or more horizontal indicia representing the at least one fixed, known object from the first image frame of the one or more initial images to create a template, and correlate additional registration zones drawn in multiple frames from subsequent images from the camera with the template;
a scoring function configured to continuously compile a score from a comparison of the additional registration zones with the template and compute a change in at least one direction of the at least one fixed, known object across the multiple frames from the score; and
a vehicular detection zone application function configured to apply the change in at least one direction to vehicular detection zones,
wherein the first image frame of the one or more initial images and the multiple frames from subsequent images each represent a portion of an image.

10. The apparatus of claim 9, wherein the vehicular detection zone application function is further configured to identify a presence of one or more vehicles in the vehicular detection zones.

11. The apparatus of claim 9, further comprising at least one output data instruction to modify a traffic signal controller based on the presence of the one or more vehicles in the vehicular detection zones.

12. The apparatus of claim 9, further comprising a stop bar detection function that computes a lane line termination threshold by analyzing vertical edges of bright pixels, and that identifies a stop bar by computing and analyzing horizontal edges of bright pixels.

13. The apparatus of claim 9, wherein the location above and proximate to the intended traffic detection area is a span wire.

14. The apparatus of claim 9, wherein the location above and proximate to the intended traffic detection area is a non-fixed position subject to movement in multiple directions.

15. The apparatus of claim 9, wherein the at least one direction is a translational direction.

16. The apparatus of claim 9, wherein the at least one direction is a rotational direction.

17. A method of stabilizing traffic detection zone tracking, comprising:
selecting one or more localized unique areas based on identifiable features available in a first image of an intended traffic detection area;
constructing one or more registration zones bordered at least in part by the identifiable features in a portion of the first image to form a template;
tracking a movement of the identifiable features in the intended traffic detection area across portions of a plurality of subsequent images relative to the one or more localized unique areas; and
applying the movement of the identifiable features to a plurality of vehicular detection zones based on a score compiled from correlating the portions of the plurality of subsequent images to the template.

18. The method of claim 17, wherein the one or more localized unique areas at least include a plurality of vertical indicia representing lane markers.

19. The method of claim 17, wherein the one or more localized unique areas further include a plurality of horizontal indicia representing a stop bar.

20. The method of claim 17, wherein the one or more localized unique areas at least include a plurality of rotational indicia identifying curvatures lanes on a roadway of the intended traffic detection area.

21. The method of claim 17, wherein the identifiable features are edges of pixels.

22. The method of claim 17, further comprising computing a lane line threshold and detecting a position of a stop bar in at least the first image.

23. The method of claim 17, wherein the intended traffic detection area is a traffic intersection in which a camera captures the first image and the subsequent images from a span wire.

* * * * *